UNITED STATES PATENT OFFICE.

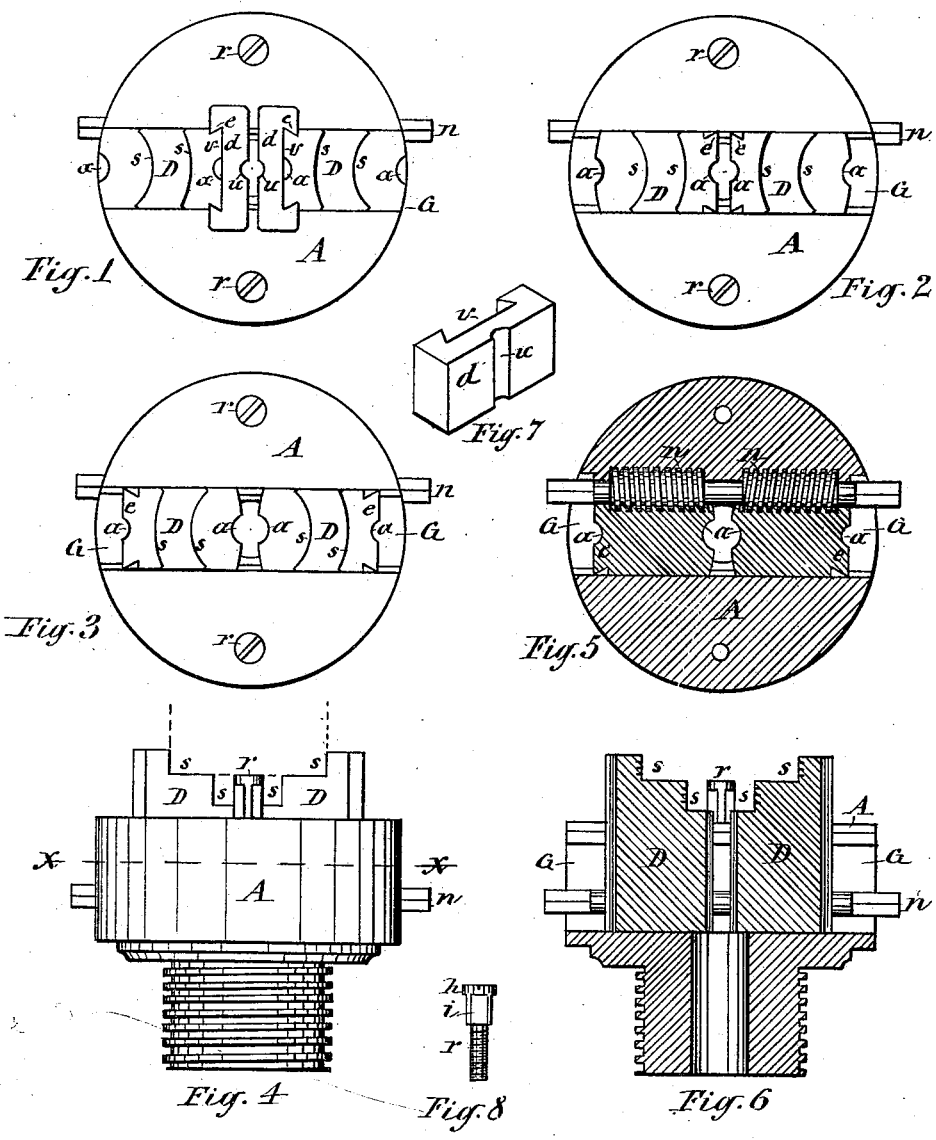

WILLIAM H. WILSON, OF ONEIDA, NEW YORK.

DRILL-CHUCK.

SPECIFICATION forming part of Letters Patent No. 240,350, dated April 19, 1881.

Application filed January 5, 1881. (No model.)

*To all whom it may concern:*

Be it known that I, WILLIAM H. WILSON, of Oneida, in the county of Madison, in the State of New York, have invented new and useful Improvements in Drill and Lathe Chucks, of which the following, taken in connection with the accompanying drawings, is a full, clear, and exact description.

This invention relates to the class of chucks usually designated "self-centering" chucks.

My invention consists in the combination, with the jaws or dogs of a chuck, of interchangeable supplemental jaws detachably applied to the jaws proper, by means of which the chuck is adapted for holding a greater variety of drills and other tools, and the attachment of the same is facilitated; and my invention furthermore consists in the combination, with a chuck provided with jaws or dogs adapted for holding work to be operated upon, of certain set-screws inserted in the face of the chuck and adapted to be made to project and support the work held by the jaws, all as hereinafter more fully described.

My invention is fully illustrated in the accompanying drawings, wherein Figure 1 is a face view of my improved chuck as adapted to hold small-sized drills; Fig. 2, a face view, showing it for holding larger-sized drills or other tools. Fig. 3 shows it arranged for holding the work to be operated upon; Fig. 4, a side view of same; Fig. 5, a transverse section on line *x x* in Fig. 4; Fig. 6, an axial section; Fig. 7, an isometric view of the supplemental jaw detached, and Fig. 8 a detail view of the screw, by means of which the work held by the jaws is supported.

Similar letters of reference indicate corresponding parts.

A denotes the body of the chuck, having a diametrical groove, G, extending completely across it. In said grooves slide two jaws or dogs, D D, arranged respectively at opposite sides of the axial center of the chuck, and retained in the diametrical groove by tongue-and-groove joints in the sides of said groove and adjacent sides of the jaws. The jaws are adjusted and secured in their requisite position by a right-and-left screw, *n*, which passes through the chuck and engages corresponding right-and-left female threads on the side of the jaws respectively, the screw *n* being properly journaled and shouldered in the chuck, so as to prevent longitudinal movement of the screw and compel the same, when turned, to move the jaws and cause the same to synchronously approach and recede from the axial center of the chuck. The jaws D, I construct with the usual shoulders or steps, *s*, for the purpose of holding the work to be operated upon, as indicated by dotted lines in Fig. 4 of the drawings. The two ends of the jaw I provide each with a groove, *a*, adapted to gripe and hold different-sized drills or other tools. Thus, by simply reversing the jaws D D, I am enabled to make the chuck serve either as a lathe-chuck for holding the work to be operated on or as a drill-chuck for holding different-sized tools to operate on work.

To still further augment the range of applicability of my improved chuck, I provide an interchangeable supplementary jaw, *d*, in the form of a block, fitted detachably to the face of the jaw D proper by a dovetail, *e*, on the latter entering a corresponding dovetail groove in the back of the former. Said block *d* is wider than the groove G, and is supported by its ends resting on the face of the chuck-body. The face of the supplemental jaw *d* is provided with a groove, *u*, smaller than either of the grooves in the jaw proper, and adapted to gripe the shank of a thin drill or other tool.

*r r* represent set-screws working in threaded holes in the chuck at opposite sides of the diametrical groove G. These set-screws have a round head, *h*, with a diametrical slot for the application of a screw-driver when said screws are sent home in the chuck and flush with the face thereof. Back of the head *h* the screw *r* has a square or hexagonal portion, *i*, for the application of a wrench. This peculiar construction is necessary in order to admit of a proper manipulation of said set-screws, their function being to support the work held by the jaws D, and when not required for use they are designed to be flush with the face of the chuck. Hence the necessity for the provisions for the application of a screw-driver for starting the set-screws out of the chuck, and for the subsequent application of a wrench for bringing said screws to bear on the end of the work held between the jaws D.

Having described my invention, what I claim as new, and desire to secure by Letters Patent, is—

1. In combination with a lathe-chuck having a groove, G, and a jaw or jaws, D, sliding therein, the supplemental jaw $d$, detachably applied to the jaw D and resting with its ends on the face of the chuck, substantially in the manner shown and set forth.

2. In combination with the chuck A and its jaws $d$, the set-screws $r$, substantially as and for the purpose set forth.

3. In combination with the chuck A, the set-screw $r$, having the circular head $h$, with a diametrical slot, and provided back of said head with the square or polygonal portion $i$, substantially as described and shown, for the purpose set forth.

In testimony whereof I have hereunto signed my name and affixed my seal, in the presence of two attesting witnesses, at Syracuse, in the county of Onondaga, in the State of New York, this 29th day of December, 1880.

WILLIAM H. WILSON. [L. S.]

Witnesses:
CHARLES E. STEVENS,
WM. C. RAYMOND.